(12) United States Patent
Karta

(10) Patent No.: US 6,170,509 B1
(45) Date of Patent: Jan. 9, 2001

(54) SAFETY VALVE SYSTEM

(75) Inventor: Yossi Karta, Netanya (IL)

(73) Assignee: Century Investments Limited, Misgav (IL)

( * ) Notice: Under 35 U.S.C. 154(b), the term of this patent shall be extended for 0 days.

(21) Appl. No.: 09/421,174

(22) Filed: Oct. 19, 1999

(51) Int. Cl.[7] ........................................ F16K 31/44
(52) U.S. Cl. ........................ 137/78.4; 251/67; 251/68; 251/74; 251/292
(58) Field of Search .................... 251/67, 68, 74, 251/291, 292; 137/78.4

(56) References Cited

U.S. PATENT DOCUMENTS

| | | | |
|---|---|---|---|
| Re. 30,135 | * 11/1979 | Fitzwater et al. | 251/68 |
| 118,008 | * 8/1871 | Gardiner, Jr. | 251/68 |
| 2,333,370 | * 11/1943 | Graham | 251/68 |
| 3,085,781 | * 4/1963 | LaPointe | 4/63 |
| 3,685,790 | * 8/1972 | Crowe | 251/67 |
| 3,923,475 | * 12/1975 | Stenzel et al. | 251/67 |
| 3,955,186 | * 5/1976 | Green et al. | 137/78.4 |
| 4,488,567 | * 12/1984 | Grant | 137/78.1 |
| 4,533,114 | * 8/1985 | Cory et al. | 251/67 |

FOREIGN PATENT DOCUMENTS

| | | |
|---|---|---|
| 0440828 | 8/1991 | (EP) . |
| 0523655 | 2/1993 | (EP) . |
| 2159249 | 11/1985 | (GB) . |

\* cited by examiner

*Primary Examiner*—A. Michael Chambers
(74) *Attorney, Agent, or Firm*—Fulbright & Jaworski, LLP

(57) ABSTRACT

A safety device for shutting off a gas valve at the detection of a gas leak has an add-on adaptor device having a first knob mounted over an existing gas knob and affixed thereto; a spindle coupled to the first knob, capable of rotating the fist knob, and the gas valve knob, between an open position and a closed position. A second knob is rotatably mounted substantially perpendicular to the spindle, and is provided with firm cantilever which is extended to provide a firm support along side the gas valve knob so as to cause rotation of the gas valve knob when the second knob is rotated in one direction. A spinning is attached to the second knob and is in a wound state when the second knob is parallel to the first knob when the first knob is in the open position, and in an unwound state when the first knob is in the closed position. A bracket is capable of being springably forced into a groove on the second knob when the second knob is aligned substantially parallel to the open position to keep it from rotating. A solenoid retracts the bracket away from the groove so the spring can rotate the second knob into the closed position. A fixing means fixes the add-on adapter device and holds the adapter in place on the existing gas valve knob. A gas leak detector detects the leaks and produces a signal to energize the solenoid and activate the device.

7 Claims, 3 Drawing Sheets

SAFETY VALVE SYSTEM

FIELD OF THE INVENTION

The present invention relates to a safety valve system for the prevention of gas leaks. More particularly it relates to an add-on safety device installed over a previously Installed valve controlling the gas flow in a gas pipe, designed to automatically shut off the valve when a gas leak is detected.

BACKGROUND OF THE INVENTION

Leakage of inflammable, explosive or toxic gasses and liquids is a major threat to human lives and properties. If unnoticed and not stopped and dealt with on time, It may result in ignition, explosion or inhalation of these dangerous substances, and subsequently in heavy casualties and damages.

Various leakage detectors are known both for industrial and home use. For example, many buildings are equipped with smoke detectors which detect the presence of smoke produced by flames and produce an alarm signal or activate water sprinklers to put out the fire. Gas detectors are also known, and widely used.

Simple types of detectors merely detect the presence of dangerous substances, whereas more sophisticated devices incorporate detection and activation of other systems generally aimed at preventing further leakage and/or removing or neutralizing the danger imposed by those leaked substances.

In EP 440828 (Gazzaz) a gas monitoring system with leak detection and flow cut off was disclosed for controlling the flow of gas from a pressurized gas container to a cooking range of a kitchen. Leaked gas is detected by a sensor which activates a visual and an audible alarm and which operates said valve to terminate the gas flow. It comprised a valve having a solenoid having an energized position for retaining the valve in an open position allowing gas to flow through the valve and a deenergized position in which the valve is shut off.

In EP 523655 (Feleppa), a safety device for detecting gas leaks was described, comprising a gas detection electronic circuit, which signals electro-magnetic waves with radio frequency, at the event of gas leak detection, to a second electronic circuit, and controls a solenoid valve for the opening and closing of the gas supply in said gas system.

UK Pat. Application publication no. 2159249 (Fuentetaja) it was disclosed a shut-off valve for the automatic closure of a gas supply, comprising a body, having an angled passage corresponding to the gas inlet, having a valve head or obturator which is urged towards an associated seat by a spring. A locking pin whose distal end is positioned inside a groove on a stem extending from the valve head, locks the valve-head in an open position. Upon the detection of a gas leak the locking pin is drawn out of the groove, by means of an electromagnet actuating the removal of the locking pin from the groove.

The abovementioned inventions seem like good solutions for the prevention of gas leaks in gas systems. But require a major adjustment to be carried out on existing gas systems, as the introduction of a new component (i.e. the automatic valve) into the existing system, and its installation is necessary. Moreover, the installation of such devices in existing gas systems require the employment of skilled specialist workers, and cannot be done by an ordinary person, who generally is the user of such gas systems.

BRIEF DESCRIPTION OF THE INVENTION

The present invention seeks to provide an add-on safety device that can be mounted on top of an existing gas valve knob and thus eliminate the need to make major changes in an existing gas system.

Further more it is the object of the present invention to provide such a safety device that would be easily installed and would permit unskilled persons to install the add-on device without the need for skilled worker's guidance and assistance.

The purpose of the gas safety add-on device of the present invention is to provide a reliable, simple to Install and to operate, add-on safety device mounted over an existing gas valve, for the controlling of gas supply and the automatic gas supply cut off in the event of gas leak detection.

It is therefore provided, in accordance with a preferred embodiment of the present invention, an add-on automatic safety gas device for shutting off a gas valve at the detection of a gas leak comprising:

An add-on adapter device comprising:

a first knob, mounted over an existing gas valve knob, and affixed to it;

a spindle coupled to said first knob, capable of rotating said first knob, and said gas valve knob, between an "open position", which is the position of the gas valve being open, allowing gas to flow through the pipe, and a "closed position", which is the position of the gas valve being closed, shutting off the gas valve;

a second knob rotatably mounted substantially perpendicular to said spindle, said second knob provided with firm cantilever which is extended to provide a firm support along side the gas valve knob, so as to cause the rotation of said gas valve knob when said second knob is rotated in one direction:

a spring attached to said second knob, wherein the spring is in a wound state when said second knob is parallel to said first knob, when said first knob is in the "open position", and wherein the spring is in an unwound state, when said second knob is parallel to said first knob when said first knob is in the "closed position", thus rendering the "closed position" a preferred state of said second knob;

a bracket capable of being springably forced into a groove on said second knob, when said second knob is aligned substantially parallel to the open position, and while inserted preventing said second knob from rotating;

a solenoid, which in its energized state retracts said bracket away from said groove, thus enabling said spring to force said second knob to rotate to the closed position;

fixing means for fixing said add-on adapter device and holding it in place when mounted over said existing gas valve knob;

a gas leak detector, capable of detecting predetermined concentrations of a predetermined gas, and upon such detection produce an electrical signal and send it via electrical connecting means to actuate said solenoid to its energized state.

Furthermore, in accordance with another preferred embodiment of the present invention, the fixing means is a clamp.

Furthermore, in accordance with another preferred embodiment of the present invention, the add-on adapter device is housed inside a housing.

Furthermore, in accordance with another preferred embodiment of the present invention, the add-on adapter housing is installed over the gas valve, and the spindle axis of rotation aligned with that of the gas valve handle.

Furthermore, in accordance with another preferred embodiment of the present invention, the add-on adapter device may be operated manually, switching said gas valve from closed position to open position and vice versa.

And finally, in accordance with another preferred embodiment of the present invention, the spring is a torsion spring.

DETAILED DESCRIPTION OF THE INVENTION AND FIGURES

Figure 1:
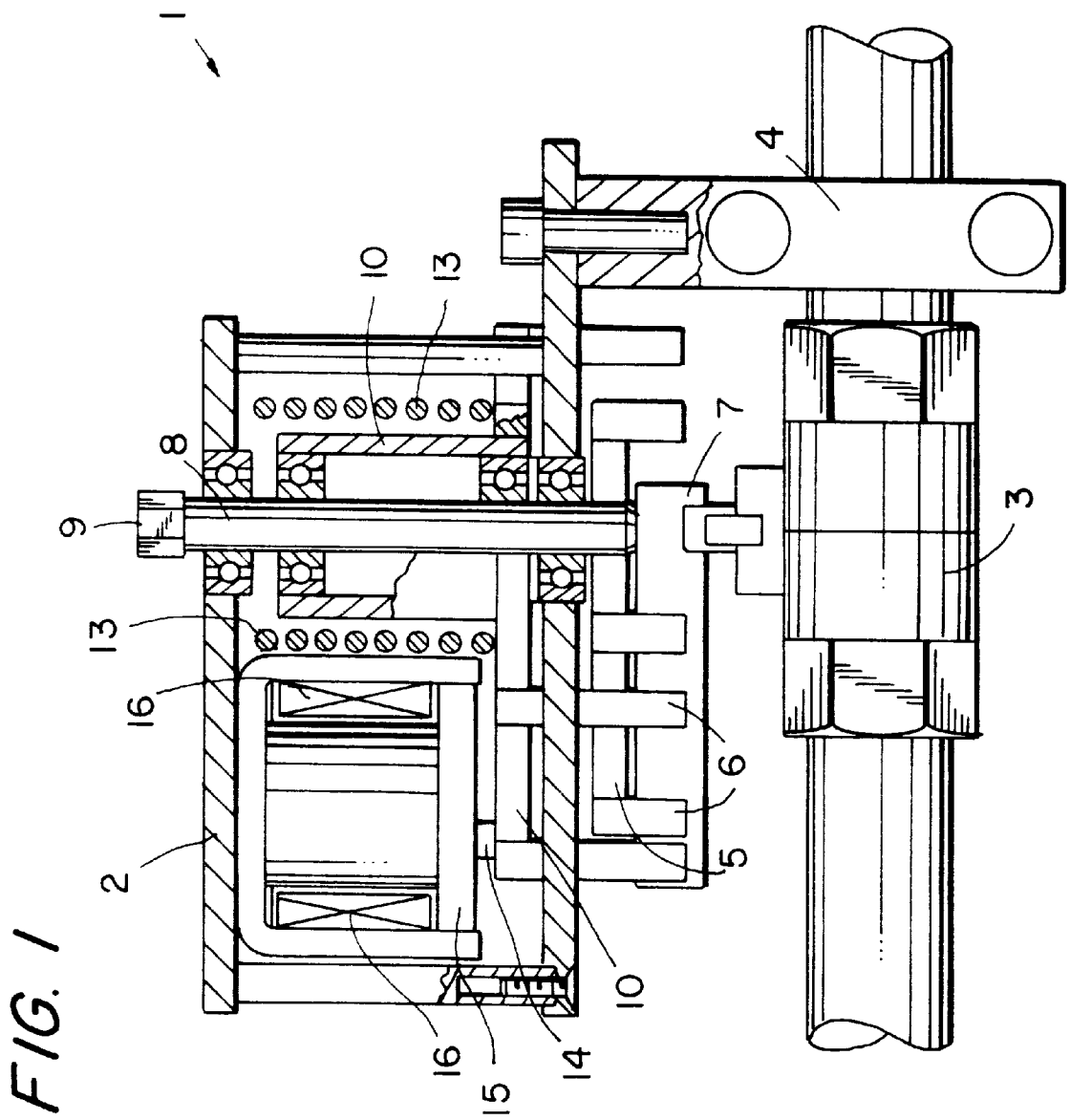
FIG. 1 illustrates an add-on safety device in accordance with a preferred embodiment of the present invention, in a cross section view.

As mentioned above, in order to use the existing gas safety devices, the replacement of an existing gas valve with a modified valve is required, and this inevitably involves relatively high installation costs and requires the employment of skilled persons in the installation of such devices.

It is therefore the main object of the present invention to provide an easy to install, add-on adapter safety device which will eliminate the need for the replacement of existing gas valve with a new one, and facilitate a simple and reliable way of installation, thus annulling the need for skilled persons for the installation.

In a nut shell the present invention seeks to provide an add-on adapter switch which can be mounted on an existing gas valve knob, and automatically actuate the closure of said valve upon the detection of gas leak by a gas leak detector.

An add-on automatic safety gas device for shutting off a gas valve at the detection of a gas leak, in accordance with the present invention comprises:

An add-on adapter device comprising:

a first knob, mounted over an existing gas valve knob, and affixed to it;

a spindle coupled to said first knob, capable of rotating said first knob, and said gas valve knob, between an "open position", which is the position of the gas valve being open, allowing gas to flow through the pipe, and a "closed position", which is the position of the gas valve being closed, shutting off the gas valve;

a second knob rotatably mounted substantially perpendicular to said spindle, said second knob provided with firm cantilever which is extended to provide a firm support along side the gas valve knob, so as to cause the rotation of said gas valve knob when said second knob is rotated in one direction;.

a spring attached to said second knob, wherein the spring is in a wound state when said second knob is parallel to said first knob, when said first knob is in the "open position", and wherein the spring is in an unwound state, when said second knob is parallel to said first knob when said first knob is in the "closed position", thus rendering the "closed position" a preferred state of said second knob;

a bracket capable of being springably forced into a groove on said second knob, when said second knob is aligned substantially parallel to the open position, and while inserted preventing said second knob from rotating;

a solenoid, which in its energized state retracts said bracket away from said groove, thus enabling said spring to force said second knob to rotate to the closed position;

fixing means for fixing said add-on adapter device and holding it in place when mounted over said existing gas valve knob;

a gas leak detector, capable of detecting predetermined concentrations of a predetermined gas, and upon such detection produce an electrical signal and send It via electrical connecting means to actuate said solenoid to its energized state.

Reference is now made to FIG. 11 illustrating a preferred embodiment of the add-on gas safety device in accordance with the present invention, shown in a cross-section view. The gas safety add-on device (generally assigned the numeral 1) comprises an add-on actuator housing (2), mounted over an existing gas valve (3), and fixed in position over said gas valve, by means of a clamp (4).

A first knob (5), provided with affixing means (6), holds onto the gas valve knob (7), thus enabling joint swiveling of said knobs. The first knob (5) is firmly attached to the proximal end of a spindle (8). which is threaded through said housing (2), with said first knob protruding out of said housing, capable of rotating substantially parallel to the axis of rotation of the gas valve knob (7). This is gained by properly positioning the add-on adapter housing (2) over the gas valve (3), and aligning the spindle axis of rotation with that of the gas valve knob, during the installation of the device over the existing gas valve. A knob (9) or handle is attached to the distal end of the spindle. The knob (9) may be manually operated to switch the gas valve from "closed" to "open" positions by turning the knob in the appropriate direction.

The device is further provided with an override mechanism which is designed, upon the event of gas leak detection, to turn off the gas valve, if it is in the open position.

A second knob (10) rotatably mounted substantially perpendicular to the spindle (8) is coupled to a torsion spring (13), and provided with firm support (11) which is positioned along side the gas valve knob (7). The torsion spring (13) is in its deenergized, unwound state, when the second knob (10) is aligned with the "closed position" of the gas valve knob (7), and in its energized, wound state, when the second knob (10) is aligned with the "open position" of the gas valve knob (7). The position of the second knob (10) is partially dependant on the position of the gas valve knob (5), so that when the second knob (10) is not aligned parallel to the "open position" alignment of the gas valve knob (5), turning of the gas valve knob (5) to its "open position" causes the second knob (10) to turn and parallely align with the gas valve knob. Accordingly, when the second knob (10) alignment is changed from the "open position" to the "closed position", it causes the gas valve knob (5) to turn, and realign with the second knob (10) in the "closed position".

When the user turns the knob (9) to the "open position", the first knob (5) is rotated to the "open position" (usually parallel to the gas pipe), and forces the second (10) to rotate accordingly. The user has to apply force to overcome the resisting force of the torsion spring (13). If the knob (9) is later turned by the user to the "closed position", the second knob (10) remains stationary in its "open position". The second knob (10) is held in place at the "open position" by means of a bracket (14) provided on a plunger (15) inserted in a groove (not showing in FIG. 1) on the second knob (10), facing said bracket. The plunger (15) is attached to the core of a solenoid coil (16). When the solenoid coil is in its deenergized position the plunger is resiliently pressed against the second knob (10), forcing the bracket of the plunger (15) into the groove on the second knob (10).

In a case of gas leak, a gas detector (not shown in FIG. 1) located in the vicinity of the gas valve detects the leak and produces an electric signal, which is transmitted via electric wiring and intercepted by an electric circuitry (all not showing in FIG. 1) preferably housed inside said add-on adapter housing (2). Upon receiving the electric signal the electric circuitry is designed to produce an electric current which energizes the solenoid coil (16), pulling the plunger (15) away from the groove in the second knob (10), and allowing the torsion spring (13) to turn the second knob (10) and consequently the gas valve knob (5) to the "closed position", thus cutting off the gas supply through the gas valve.

Once the leak is taken care of and the dangerous situation is cleared, the device may be brought to its "open position" by manually turning the knob (9) to regain the "open position".

It is noted that the gas valve may at all times be operated manually by turning the knob (9) in the desired direction, and closing or opening it as required.

Figure 2:
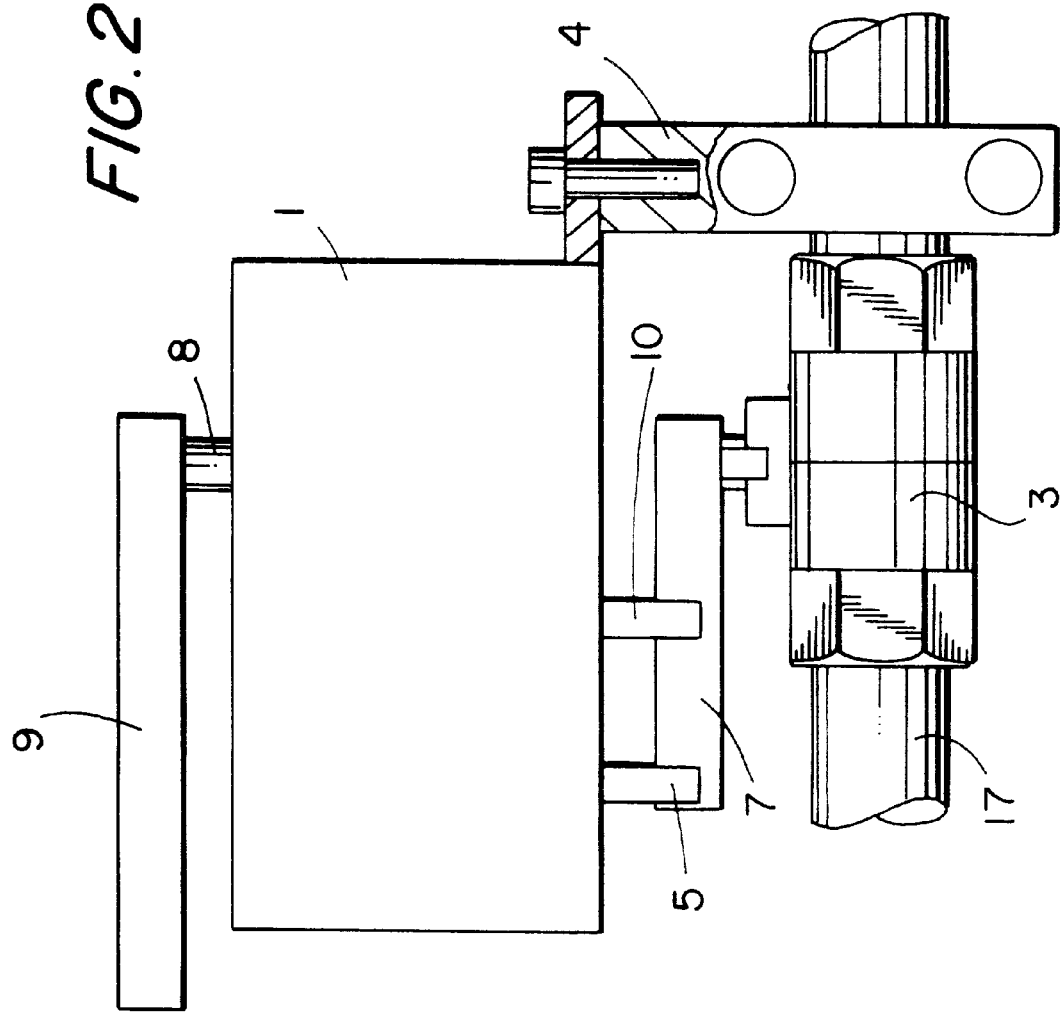
FIG. 2 illustrates an add-on safety device in accordance with a preferred embodiment of the present invention, mounted over a standard 90 degrees ball valve, and held at "open" position.

FIG. 2 illustrates an add-on safety device (1) in accordance with a preferred embodiment of the present invention, mounted over a standard 90 degrees ball valve (3), and held at "open" position. The housing (2) is mounted over the gas valve (3), and kept in position by means of a clamp (4). The knob (9) at the top of the spindle (8), here in the form of a handle is rotated to the open position, which is parallel to the gas pipe (17).

Figure 3:
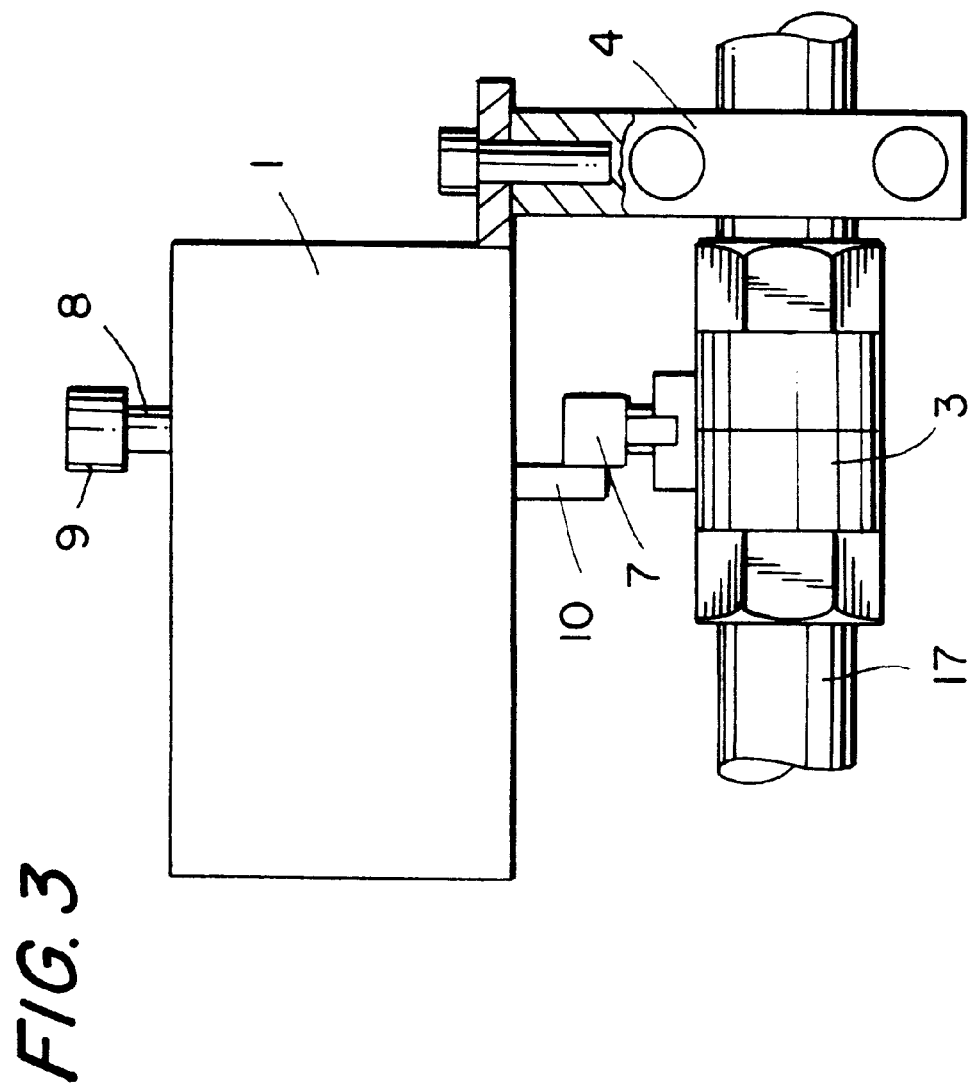
FIG. 3 illustrates the same preferred embodiment as shown in FIG. 2, mounted over a standard 90 degrees ball valve, after it had been actuated and brought to its closed position.

FIG. 3 illustrates an add-on safety device (1) in accordance with a preferred embodiment of the present invention, mounted over a standard 90 degrees ball valve (3), after being actuated to turn the valve handle (7) to its closed position, in the event of gas leak detection. After the gas leak had been taken care of, and the danger cleared, the gas valve may be manually opened, by rotating the knob (9) to the "open position".

It should be clear that the description of the embodiments and attached Figures set forth in this specification serves only for a better understanding of the invention, without limiting its scope as covered by the following Claims.

It should also be clear that a person in the art, after reading the present specification could make adjustments or amendments to the attached Figures and above described embodiments that would still be covered by the following Claims.

What is claimed is:

1. An add-on automatic safety gas device for shutting off a gas valve at the detection of a gas leak comprising:

an add-on adapter device comprising:

a first knob, mounted over an existing gas valve knob, and affixed to it;

a spindle coupled to said first knob, capable of rotating said first knob, and said gas valve knob, between an "open position", which is the position of the gas valve being open, allowing gas to flow through the pipe, and a "closed position", which is the position of the gas valve being closed, shutting off the gas valve;

a second knob rotatably mounted substantially perpendicular to said spindle, said second knob provided with firm cantilever which is extended to provide a firm support along side the gas valve knob, so as to cause the rotation of said gas valve knob when said second knob is rotated in one direction;

a spring attached to said second knob, wherein the spring is in a wound state when said second knob is parallel to said first knob, when said first knob is in the "open position", and wherein the spring is in an unwound state, when said second knob is parallel to said first knob when said first knob is in the "closed position", thus rendering the "closed position" a preferred state of said second knob;

a bracket capable of being springably forced into a groove on said second knob, when said second knob is aligned substantially parallel to the open position and while inserted preventing said second knob from rotating;

a solenoid, which in its energized state retracts said bracket away from said groove, thus enabling said spring to force said second knob to rotate to the closed position;

fixing means for fixing said add-on adapter device and holding it in place when mounted over said existing gas valve knob;

a gas leak detector, capable of detecting predetermined concentrations of a predetermined gas, and upon such detection produce an electrical signal and send it via electrical connecting means to actuate said solenoid to its energized state.

2. The device according to claim 1, wherein said fixing means is a clamp.

3. The device according to claim 1, wherein said add-on adapter device is housed inside a housing.

4. The device according to claim 3, wherein the add-on adapter housing is installed over the gas valve, and the spindle axis of rotation aligned with that of the gas valve handle.

5. The device according to claim 1, wherein said add-on adapter device may be operated manually, switching said gas valve from closed position to open position and vice versa.

6. The device according to claim 1, wherein said existing gas valve is a standard 90 degrees ball valve.

7. The device according to claim 1, wherein said spring is a torsion spring.

* * * * *

UNITED STATES PATENT AND TRADEMARK OFFICE
CERTIFICATE OF CORRECTION

PATENT NO.   : 6,170,509 B1
DATED        : January 9, 2001
INVENTOR(S)  : Yossi Karta It is certified that error appears in the above-identified patent and that said Letters Patent is hereby corrected as shown below:

On the cover page, insert section entitled
--Foreign Application Priority Data June 6, 1999 [IL] Israel    130651--

In column 1, line 6, change "Install" to --install--.

In column 1, line 56, after "systems" delete comma.

In column 1, line 56, change "But" to --but--.

In column 2, line 11, change "Install" to --install--.

In column 4, line 25, change "." to --,--.

Signed and Sealed this

Tenth Day of July, 2001

*Attest:*

NICHOLAS P. GODICI
*Attesting Officer*   Acting Director of the United States Patent and Trademark Office